US012083808B2

(12) United States Patent
Svoboda et al.

(10) Patent No.: US 12,083,808 B2
(45) Date of Patent: Sep. 10, 2024

(54) METHOD FOR PRINTING A PRINT JOB WITH A PRINTING MACHINE

(71) Applicant: Heidelberger Druckmaschinen AG, Heidelberg (DE)

(72) Inventors: Petra Svoboda, Nussloch (DE); Nikolaus Pfeiffer, Heidelberg (DE); Stefan Bollmann, Hamburg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 224 days.

(21) Appl. No.: 17/841,877

(22) Filed: Jun. 16, 2022

(65) Prior Publication Data

US 2022/0402288 A1 Dec. 22, 2022

(30) Foreign Application Priority Data

Jun. 16, 2021 (DE) ..................... 10 2021 115 528.2

(51) Int. Cl.
*B41J 29/393* (2006.01)
*B41F 33/00* (2006.01)
*B41F 33/16* (2006.01)

(52) U.S. Cl.
CPC ......... *B41J 29/393* (2013.01); *B41F 33/0009* (2013.01); *B41F 33/0027* (2013.01); *B41F 33/0036* (2013.01); *B41F 33/0045* (2013.01); *B41F 33/16* (2013.01); *B41P 2233/10* (2013.01); *B41P 2233/11* (2013.01)

(58) Field of Classification Search
CPC . B41J 29/393; B41F 33/0009; B41F 33/0036; B41F 33/16; B41F 33/0045; B41F 33/0027; B41P 2233/10; B41P 2233/11
See application file for complete search history.

(56) References Cited

U.S. PATENT DOCUMENTS

| | | | | |
|---|---|---|---|---|
| 6,679,169 | B2 * | 1/2004 | Anweiler | B41F 31/00 101/364 |
| 2021/0294540 | A1 * | 9/2021 | Pfeiffer | G06F 3/1259 |

FOREIGN PATENT DOCUMENTS

| | | | | |
|---|---|---|---|---|
| DE | 10245702 | A1 | 5/2003 | |
| DE | 102013113280 | A1 | 7/2014 | |
| DE | 102021104963 | A1 | 9/2021 | |
| WO | WO-2020257788 | A1 * | 12/2020 | B41F 33/0036 |

* cited by examiner

*Primary Examiner* — Yaovi M Ameh

(74) *Attorney, Agent, or Firm* — Laurence A. Greenberg; Werner H. Stemer; Ralph E. Locher

(57) ABSTRACT

A printing method includes determining a master machine setting by using a master substrate, printing a first test print including test fields, and using a first combination of printing fluid and master substrate, recording test fields of the first test print, and computationally determining and storing a first setting value for a first machine setting as the master setting. Printing a print job is prepared by changing the substrate to a second combination of printing fluid and substrate, printing a second test print including test fields, and using the second combination of printing fluid, substrate and master setting, recording the test fields of the second test print, and computationally determining and storing a second setting value for a second machine setting, the second setting value defined relative to the master setting. The print job is printed by using the second combination of printing fluid, substrate and second machine setting.

8 Claims, 5 Drawing Sheets

METHOD FOR PRINTING A PRINT JOB WITH A PRINTING MACHINE

CROSS-REFERENCE TO RELATED APPLICATION

This application claims the priority, under 35 U.S.C. § 119, of German Patent Application DE 10 2021 115 528.2, filed Jun. 16, 2021; the prior application is herewith incorporated by reference in its entirety.

FIELD AND BACKGROUND OF THE INVENTION

The invention relates to a method for printing a print job with a printing machine.

The invention relates to the field of the graphics industry, and therein particularly in the area of setting or calibrating a printing machine for a print job, in particular a printing machine having printing formes or printing heads, with a variation of machine settings being carried out, for example, when changing the substrate to be printed.

It is known that setting values for machine settings of a particular printing machine are separately determined and stored for each print job for a plurality of print jobs on that printing machine, with the setting values being determined and stored as absolute values. In that case, the print jobs may for example differ from one another in that different substrates, for example papers, are used. That procedure is disadvantageous, however, since it is time-consuming and since the setting values or machine settings obtained, which are generally provided as data sets, can be used only on the particular printing machine—and not others. The data sets are therefore not transferable.

It is also known that substrates are selected by printing machine manufacturers and qualified for use on their printing machines. Thiat applies, for example, for offset printing machines and for digital printing machines, for example inkjet machines.

SUMMARY OF THE INVENTION

It is accordingly an object of the invention to provide an improved method for printing a print job with a printing machine, which overcomes the hereinafore-mentioned disadvantages of the heretofore-known methods of this general type and which makes it possible in particular to carry out the setting (or calibration) of a printing machine for a print job—with a variation of machine settings taking place, for example when changing the substrate—in such a way that qualitatively satisfactory printing results are achieved.

With the foregoing and other objects in view there is provided, in accordance with the invention, a method for printing a print job with a printing machine, which comprises the following steps: a) determining a master setting for the printing machine, wherein step a includes: a1) providing a substrate as a master substrate; a2) printing a first test print, which includes a multiplicity of test fields, with the printing machine, and wherein a first combination of a printing fluid and the master substrate is used; a3) recording all or at least a selection of the test fields of the first test print by using a recording device; and a4) computational determination and storage of at least one first setting value for a first machine setting of the printing machine as the master setting; or wherein step a) includes: a1) providing a substrate as a master substrate; and a4') computational determination and storage of at least one first setting value for a first machine setting of the printing machine as a master setting and for a first combination of a printing fluid and the master substrate, wherein the computational determination is carried out on the basis of a computer-implemented mathematical model which includes a mathematical representation of the printing machine, of the printing fluid and of the substrate, or on the basis of an AI-trained with stored data relating to printing machines and/or substrates; b) preparing the printing of a print job with the printing machine, wherein step b includes: b1) changing the substrate to a second combination of printing fluid and substrate; b2) printing a second test print, which includes a multiplicity of test fields, with the printing machine, and wherein the second combination of printing fluid and substrate and the master setting are used; b3) recording all or at least a selection of the test fields of the second test print by using a recording device; and b4) computational determination and storage of at least one second setting value for a second machine setting, the second setting value being defined as a value relative to the master setting; and c) printing the print job with the printing machine, wherein the second combination of printing fluid and substrate and the second machine setting are used.

With the objects of the invention in view, there is also provided a further method for printing a print job with a printing machine, which comprises, before the printing, a first machine setting for the printing machine is determined as a master setting by using a first substrate as a master substrate, and during the printing by using a second substrate different from the first substrate, in which a second machine setting which is defined relative to the master setting is used.

The invention advantageously makes it possible to carry out the setting (or calibration) of a printing machine for a print job—with a variation of machine settings taking place, for example when changing printing fluid and/or substrate—in such a way that qualitatively satisfactory printing results are achieved.

Unlike the prior art, the setting (or: calibration) of a printing system, in particular a printing machine, that is to say the variation of the machine setting or at least one—in the present case the second—setting value, when changing the substrate, is carried out not as an absolute value but according to the invention as a relative value in relation to a machine setting.

The invention offers the advantage that, in the case of varying master settings, all further machine settings can be adapted rapidly, with little outlay and in an automated fashion. The time-intensive and labor-intensive printing trials, for example further test prints with wastage of paper, may in this case be avoided.

One setting value which may be defined as a relative value is, for example, the so-called ink limit, that is to say the maximum possible ink application with the required printing quality.

Further such setting values are, for example, the ink presetting (in the case of offset printing) or the presetting for DUC and/or MNC (in the case of inkjet printing). DUC is defined as "Density Unevenness Compensation," that is to say compensation for undesired ink density variations in the print image, and MNC is defined as "Missing/Malfunctioning Nozzle Compensation," that is to say compensation for undesired absence or malfunctions of printing nozzles.

Further such setting values are for example substrate pretreatments, in particular corona treatment, and/or substrate/fluid after-treatments, in particular drying, hardening and/or pinning.

The invention furthermore offers the advantage that machine settings may be transferred from one printing machine to another printing machine. In this case, a function for adapting or transferring the machine settings between the machines may be used.

The substrate may be paper, board, film (plastic or metal) or label material. The substrate may be in the form of a sheet or web.

The substrate selected as the master substrate is preferably a substrate with high and stable quality, which is usually available in printing premises or can be readily obtained. The master substrate may also be referred to as a standard substrate.

The master substrate may be an individual substrate type, for example particular paper, or a group of different substrate types. The latter is advantageous when very different substrates are intended to be used, for example paper and film.

The first setting value is determined for the master substrate (one might also say: "on" the master substrate). Conversely, the master substrate is provided and used for determining the first setting value.

The second setting value is preferably determined for a substrate—different from or deviating from the master substrate (one might also say "on" this substrate). It is advantageous and therefore preferred for the substrates being used to be similar to the master substrate. Whether substrates are similar in this context may preferably be determined by a correlation analysis. Example: there are n (with n>=2) parameter sets for a substrate group A and for the master substrate; and the correlation coefficient is calculated, that is to say a test is made as to whether the variations in substrate group A correlate with the variations of the master substrate.

It is furthermore advantageous and therefore preferred for printing machines to use similar principles in respect of the machine parameter set, that is to say the machine settings, for example the same type of inking (for example inkjet). A link between, for example, inkjet-based and toner-based systems in respect of inking parameters is however (because of dissimilar principles) not or only very restrictedly possible. On the other hand, it may be possible to couple the paper transport parameters of the two systems, if the paper transport is based on similar principles.

The printing fluid may be a printing ink, for example an offset printing ink, or a toner or an inkjet ink, for example a UV-curable inkjet ink.

A change of the printing fluid may be carried out in that the printing fluid itself is changed and/or the raster with which the printing fluid is printed onto the substrate is changed.

The first setting values may be an individual setting value or a set of setting values for the first machine setting of the printing machine. The second setting value may likewise be an individual setting value or a set of setting values for the second machine setting of the printing machine.

The master setting is preferably a set of setting values and may be a complete set of setting values, that is to say the set may include all important setting values of the printing machine.

The first setting value and/or the second setting value may in offset printing be, for example, an ink presetting (IPS) for ink zones, or in inkjet printing for example a presetting for a so-called "Density Unevenness Compensation" (DUC) and/or "Missing/Malfunctioning Nozzle Compensation" (MNC). According to the invention, the relative value is related to the master setting.

The relation may be additive: for example DUCprintjob=DUCmasterjob+RW, where DUCprintjob is the presetting of the DUC for the print job (corresponding to step c of the method according to the invention), DUCmasterjob is the presetting of the DUC for the master job (corresponding to step a2 of the method according to the invention) and RW is the relative value. Correspondingly, for example, MNCprintjob=MNCmasterjob+RW or IPSprintjob=IPSmasterjob+RW.

The relation may be multiplicative: for example IPSprintjob=IPSmasterjob*RW, where IPSprintjob is the ink presetting for the print job (corresponding to step c of the method according to the invention), IPSmasterjob is the ink presetting for the master job (corresponding to step a2 of the method according to the invention) and RW is the relative value. Correspondingly, for example, DUCprintjob=DUCmasterjob*RW or MNCprintjob=MNCmasterjob*RW.

The relation may alternatively be stored in the form of a more complex—in comparison with addition or multiplication—mathematical function.

The reference may alternatively be produced or trained by using so-called artificial intelligence (AI), in particular by using a digital computer or a so-called artificial neural network. Stored data relating to printing machines and/or substrates, in particular previous machine settings with various substrates to be printed, may be used for the training.

An ICC profile used for the printing may be a conventional ICC profile, in particular an ICC profile for a printing machine, for example an offset printing machine or a toner printing machine or an inkjet printing machine.

The first and/or second machine setting may respectively be a setting or a set of settings for the printing machines, for example an amount of ink or inkjet ink to be transferred. The same applies for the first and/or second setting value.

The change of the substrate from a first combination of printing fluid and substrate to a second combination of printing fluid and substrate may take place automatically, for example under the control of a digital computer. As an alternative, the change may be carried out manually.

During the change of the combination of printing fluid and substrate in steps b1 and b2, the master setting remains substantially unchanged, that is to say possible variations to the master setting, which are not due to the change of the printing fluid and/or the change of the substrate, remain neglected—since they are not important in this context.

Instead of only one first test print, a plurality of first test prints may also be printed. Instead of only one second test print, a plurality of second test prints may also be printed.

Preferred refinements of the invention (abbreviation: refinements) will be described below.

One refinement may be distinguished in that the print job and a further print job are the same as one another. One refinement may be distinguished in that the print job and a further print job are different from one another. In this case, "print job" means: the print image to be printed or its data. In the case of the same print job, the printing fluid and/or the substrate may also be varied, that is to say changed.

One refinement may be distinguished in that the first printing fluid (printing fluid in the first combination) is a first printing ink or a first set of printing inks and the second printing fluid (printing fluid in the second combination) is a second printing ink or a second set of printing inks. The printing inks may preferably be offset printing inks. A set of printing inks may include the process colors CMYK (cyan, magenta, yellow, black) and optionally special colors.

One refinement may be distinguished in that the first printing ink and the second printing ink are the same as one another or that the first set of printing inks and the second set of printing inks are the same as one another. One refinement may be distinguished in that the first printing ink and the second printing ink are different from one another or in that the first set of printing inks and the second set of printing inks are different from one another. For example, printing ink sets from different manufacturers may be used.

One refinement may be distinguished in that the second machine setting includes a variation of the amount of printing ink or the amount of at least one printing ink of the set of printing inks in relation to the first machine setting or the master setting, with the second setting value being used for the variation.

One refinement may be distinguished in that in step a) a first printing forme or a set of first printing formes are used. The first printing forme or the first set of printing formes may be produced with an exposure unit. The production may be carried out before step a. The printing forme may be a printing plate, for example an offset printing plate.

One refinement may be distinguished in that step c) furthermore includes: c1) production of a second printing forme or a set of second printing formes. One refinement may be distinguished in that the second printing forme or the set of second formes is produced in such a way that the modified amount of printing ink is thereby transferred onto the substrate. One refinement may be distinguished in that the production includes exposure, with the setting value or a value corresponding thereto or calculated therefrom being used. One refinement may be distinguished in that in step c), the second printing forme or the set of second printing formes is used. In the scope of the setting (or: calibration), a different printing forme or a different set of printing formes—in comparison with the first printing forme/the first set of printing formes—is therefore preferably produced and subsequently used, which transfers different amounts of ink. An ICC profile used during the printing preferably remains substantially unchanged, however. The printing forme may be a printing plate, for example an offset printing plate.

One refinement may be distinguished in that the first printing fluid (printing fluid in the first combination) is a first inkjet ink or a first set of inkjet inks and the second printing fluid (printing fluid in the second combination) is a second inkjet ink or a second set of inkjet inks. The inkjet inks may preferably be UV-curable inkjet inks. A set of inkjet inks may include the process colors CMYK (cyan, magenta, yellow, black) and optionally special colors.

One refinement may be distinguished in that the first inkjet ink and the second inkjet ink are the same as one another or in that the first set of inkjet inks and the second set of inkjet inks are the same as one another. One refinement may be distinguished in that the first inkjet ink and the second inkjet ink are different from one another or in that the first set of inkjet inks and the second set of inkjet inks are different from one another. For example, inkjet ink sets from different manufacturers may be used.

One refinement may be distinguished in that the second machine setting includes a variation of the amount of inkjet ink or the amount of at least one inkjet ink of the set of inkjet inks in relation to the first machine setting or the master setting, with the setting value being used for the variation.

One refinement may be distinguished in that step c) furthermore includes: c2) varying the calibration of printing heads of the printing machine. The calibration may in this case be carried out by using a characteristic calibration curve. In the scope of the setting (or: calibration), a different characteristic calibration curve is preferably produced and subsequently used for the printing heads, which makes it possible to transfer different amounts of ink. An ICC profile used during the printing preferably remains substantially unchanged, however. A separate characteristic curve may be produced for each printing head.

One refinement may be distinguished in that the first and/or the second test print includes a media wedge. The media wedge may form the test fields, at least the selected test fields, or be provided in addition to the test fields. One refinement may be distinguished in that the media wedge is a Fogra media wedge.

One refinement may be distinguished in that the variation of the setting of the printing machine is carried out automatically, for example by a digital computer. One refinement may be distinguished in that the variation of the setting of the printing machine is carried out manually.

One refinement may be distinguished in that the recording device is a camera. One refinement may be distinguished in that the recording device is a spectrometer.

One refinement may be distinguished in that a digital computer is used for the computational determination and storage of the second setting value.

One refinement, in particular of the further method according to the invention, may be distinguished in that an ink presetting or a setting for DUC and/or MNC is in this case relatively defined. DUC is defined as "Density Unevenness Compensation," that is to say compensation for undesired ink density variations in the print image, and MNC is defined as "Missing/Malfunctioning Nozzle Compensation," that is to say compensation for undesired absence or malfunctions of printing nozzles.

The features and feature combinations disclosed in the sections above relating to technical field, invention and refinements and in the following section relating to exemplary embodiments represent—in any desired combination with one another—further advantageous refinements of the invention.

Other features which are considered as characteristic for the invention are set forth in the appended claims.

Although the invention is illustrated and described herein as embodied in a method for printing a print job with a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
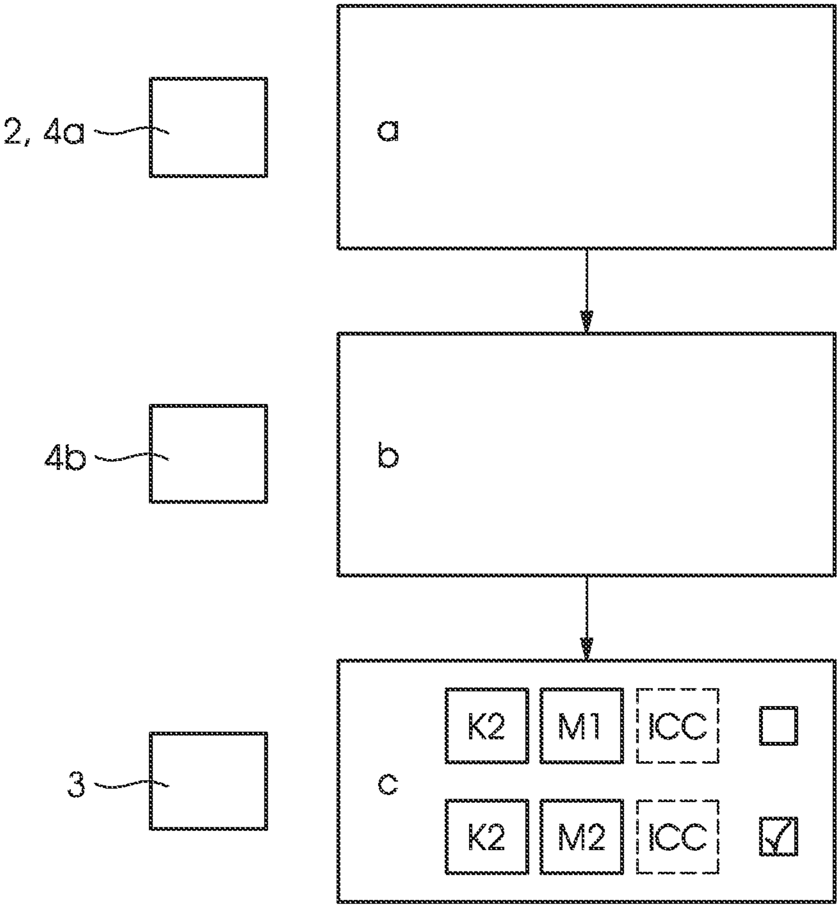
FIGS. 1 to 4 show preferred exemplary embodiments of the invention and of the refinements thereof. Features that correspond to one another are provided with the same reference symbols in the figures. Reference symbols that recur have sometimes been omitted in the figures for the sake of clarity.
Figure 2A:
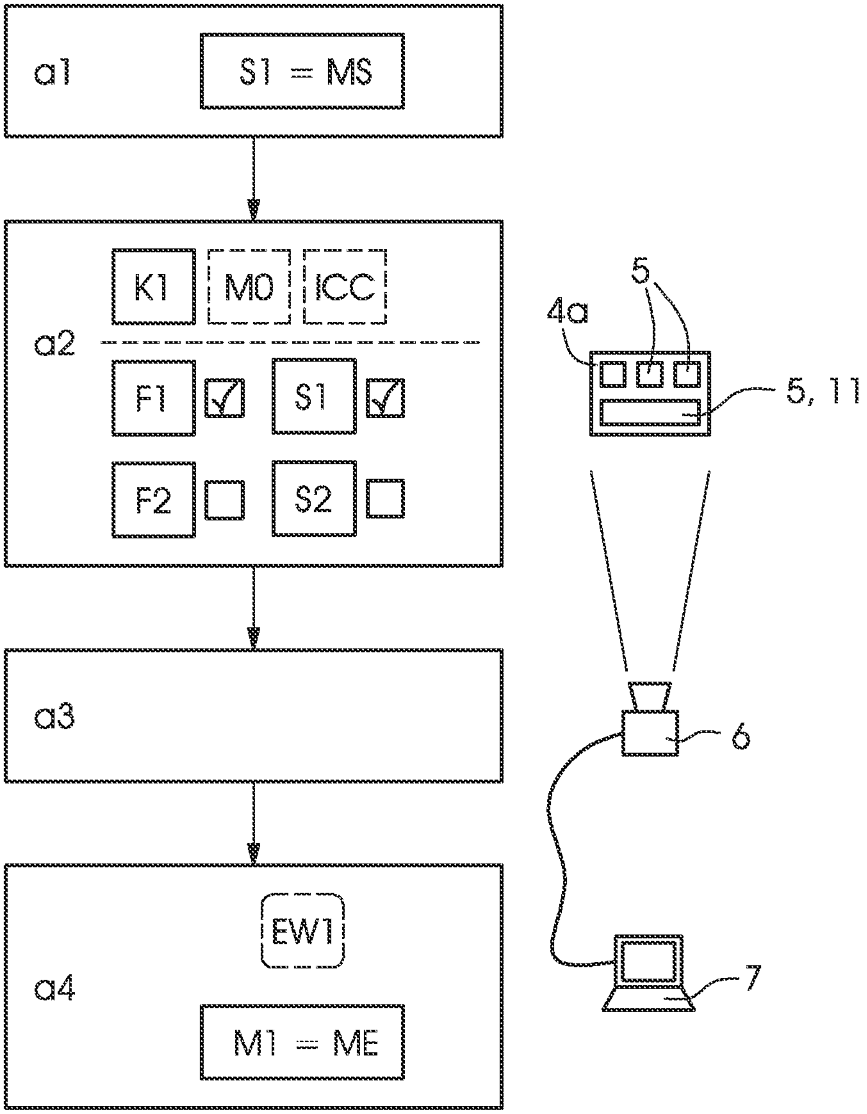
Figure 2B:
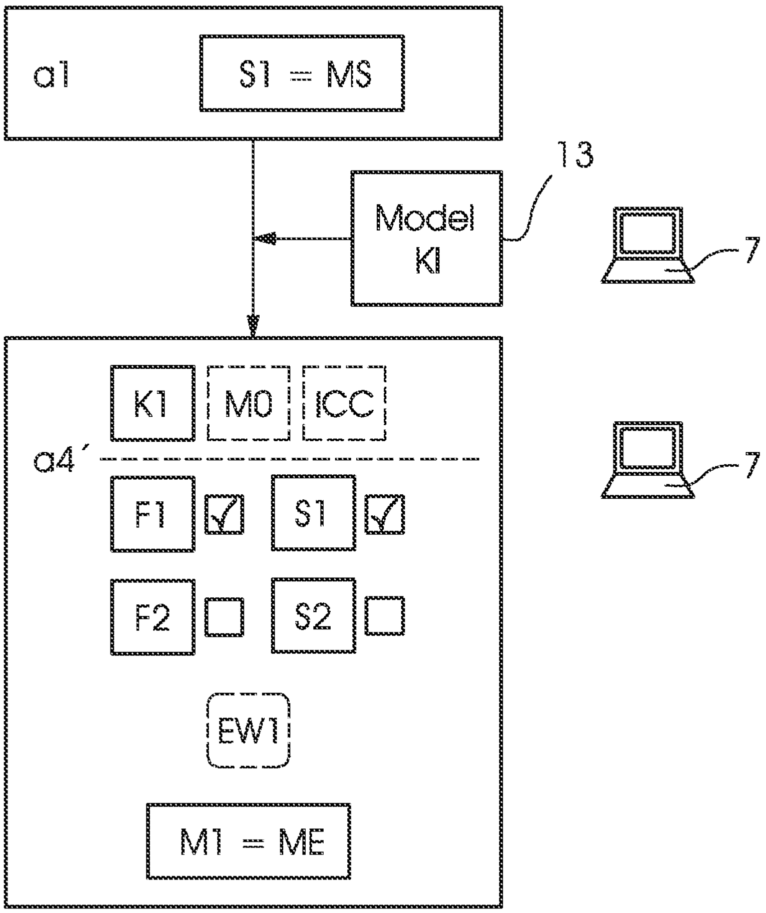
Figure 3:
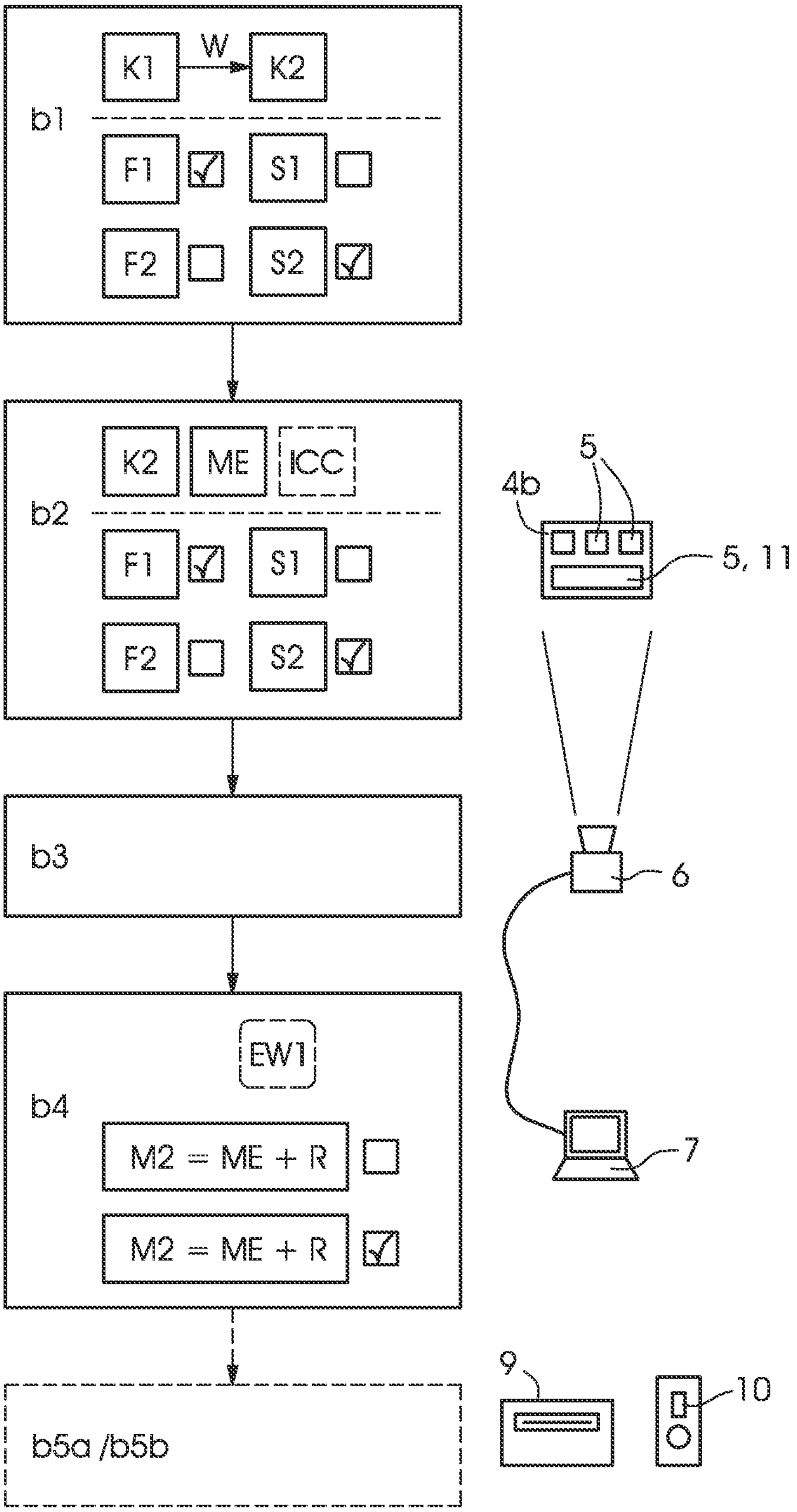

Referring now to the figures of the drawings in detail and first, particularly and respectively to FIGS. 1, 2A, 2B and 3 thereof, there are seen details of a preferred exemplary embodiment of a method according to the invention for printing at least two print jobs with a printing machine, in which: FIG. 1 shows method steps a to c, FIG. 2A shows method steps a1 to a4, FIG. 2B shows the alternative method steps a1 and a4' to FIG. 2A, and FIG. 3 shows method steps b1 to b4 and optionally to b5*a* or b5*b*.

Figure 4:
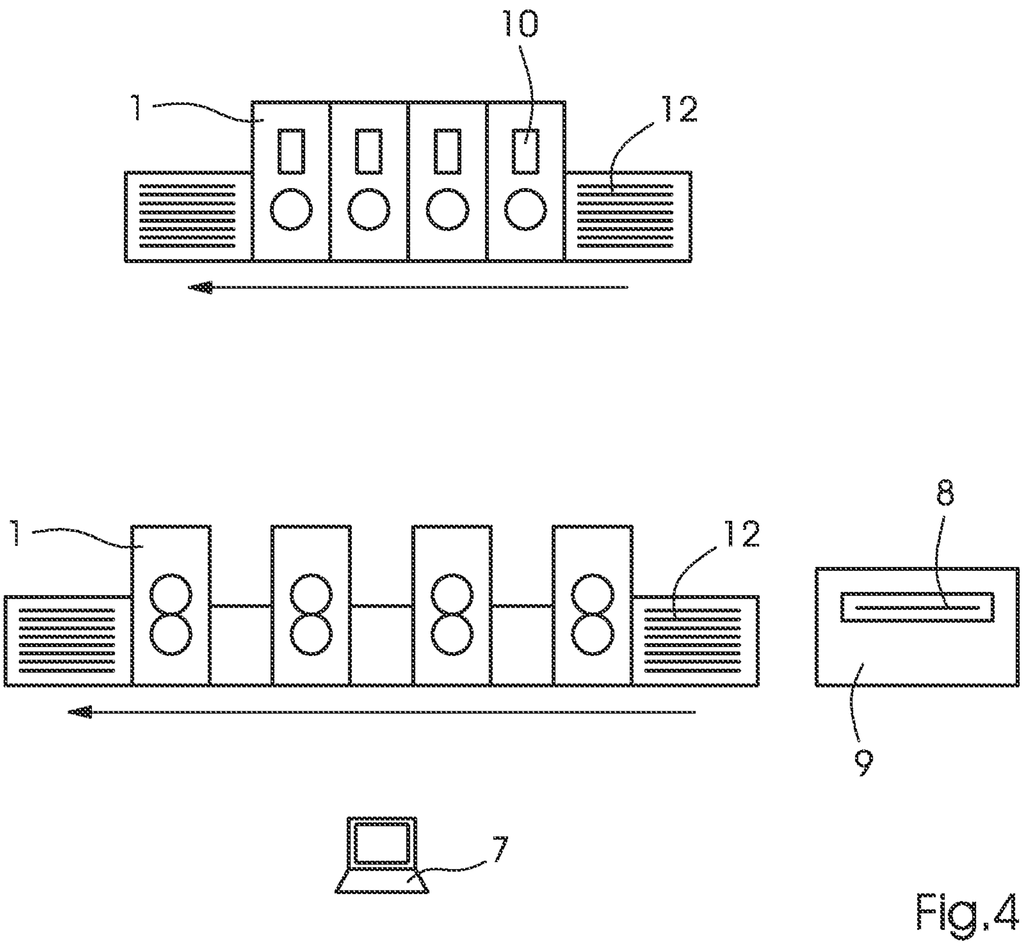

Step a): determining (a) a master setting for the printing machine 1 (compare also FIG. 4).

Step a includes the substeps a1 to a4:

Substep a1) providing a1 a substrate as a so-called master substrate MS. In the example shown, the substrate is a first substrate S1, for example a paper.

Substep a2): printing a2 a first test print 4*a*, which includes a multiplicity of test fields 5, with the printing machine 1, in which a first combination K1 of a printing fluid and the master substrate MS, that is to say in the example shown S1, is used. The printing fluid is a first printing fluid F1 in the example shown. The machine setting may be a setting M0, for example a machine default setting or a machine setting from a previous print job. Optionally, an ICC profile is used. The first test print 4*a* may include a media wedge 11, for example a Fogra media wedge.

Substep a3): recording a3 all or at least a selection of the test fields 5 (and/or of the media wedge 11) of the first test print 4*a* by using a recording device 6, for example a camera or a spectrometer. The recorded result, for example a camera image, is preferably transmitted to a digital computer 7.

Substep a4): computational determination and storage a4 of at least one first setting value (EW1) from the recorded test fields 5 (and/or the media wedge 11) for a first machine setting M1 of the printing machine 1 as the master setting ME. In this case, the digital computer 7 (or alternatively: a further digital computer) may be used.

Alternatively, step a includes the substeps a1 and a4':

Substep a1): providing a1 a substrate as a so-called master substrate MS. In the example shown, the substrate is a first substrate S1, for example a paper.

Substep a4'): computational determination and storage a4' of at least one first setting value (EW1) for a first machine setting M1 of the printing machine 1 as the master setting ME and for a first combination K1 of a printing fluid and the master substrate MS, that is to say in the example shown S1, the computational determination being carried out on the basis of a computer-implemented mathematical model 13 which includes a mathematical representation of the printing machine, of the printing fluid and of the substrate, or on the basis of an AI 13—trained with stored data relating to printing machines and/or substrates. The printing fluid is a first printing fluid F1 in the example shown. The machine setting may be a setting M0, for example a machine default setting or a machine setting from a previous print job. Optionally, an ICC profile is used.

Step b) preparing b the printing of a print job 3 with the printing machine 1.

Step b includes the substeps b1 to b4, but optionally to b5*a* or b5*b*.

Substep b1): changing W the substrate to a second combination K2 of printing fluid and substrate (and/or raster). In the example shown, the printing fluid remains the first printing fluid F1 and the substrate changes to a second substrate S2, for example different paper. Alternatively, other changes may be carried out, for example F1 to F2 with S1 to S2. More than just two printing fluids or two substrates may also be available for the change W: in general there are n different printing fluids and m different substrates (with $n>1$ and $m>1$).

Substep b2): printing b2 a second test print 4*b*, which includes a multiplicity of test fields 5, with the printing machine 1, in which the second combination K2 of printing fluid and substrate and the master setting ME are used.

Substep b3): recording b3 all or at least a selection of the test fields 5 (and/or the media wedge 11) of the second test print 4*b* by using a recording device 6, for example a camera or a spectrometer. The recorded result, for example a camera image, is preferably transmitted to a digital computer 7.

Substep b4): computational determination and storage b4 of at least one second setting value EW2 for a second machine setting M2, the second setting value being defined as a value relative to the master setting ME. In the example shown, M2=ME*R, where R is a relative value. In this case, the digital computer 7 (or alternatively: a further digital computer) may be used.

The second machine setting M2 may include a variation of the amount of printing ink or the amount of at least one printing ink of the set of printing inks in relation to the first machine setting M1, with the second setting value EW2 being used during the variation. The second setting value may, for example, be the value of the variation (that is to say relative) or of the value newly to be set (that is to say absolute).

Optional substep b5*a* (in the case of a printing machine with printing formes, for example offset printing): producing a second printing forme 8 or a set of second printing formes 8. In this case, the second printing forme or the set of second printing formes can be produced in such a way that the modified amount of the printing ink is thereby transferred onto the substrate. The production may include exposure with an exposure unit 9, with the second setting value EW2 or a value corresponding thereto being used.

Optional substep b5*b* (in the case of a printing machine with printing heads, for example inkjet printing): varying the calibration of the printing heads 10 of the printing machine 1.

Step c): printing c the print job 3 with the printing machine 1, with the second combination K2 of printing fluid and substrate and the second machine setting M2 being used. Optionally, an ICC profile is used.

FIG. 4 shows a device which is used when carrying out a preferred exemplary embodiment of the method according to the invention. In this case, a printing machine 1 is used: either a printing machine with printing formes 8—preferably exposed by an exposure unit or imager 9—(represented in the lower figure: for example an offset printing machine) or a printing machine with printing heads 10 (represented in the upper figure: for example an inkjet printing machine). The control of the printing machine 1 is carried out by the digital computer 7 or a further digital computer 7. The printing machine delivers (as indicated by the arrow) and processes a substrate 12. In the example shown, the substrates are in the form of sheets from a stack; alternatively, the substrates can be in the form of a web from a roll.

The following is a summary list of reference numerals and the corresponding structure used in the above description of the invention.

LIST OF REFERENCES

1 printing machine
2 determining a master setting, in particular the first test print
3 print job
4*a* first test print
4*b* second test print
5 multiplicity of test fields
6 recording device, in particular camera or spectrometer

7 digital computer
8 printing formes
9 exposure unit
10 printing heads
11 media wedge
12 substrate
13 mathematical model or AI
F1 first printing fluid, in particular printing ink or inkjet ink
F2 second printing fluid, in particular printing ink or inkjet ink
S1 first substrate, in particular sheet
S2 second substrate, in particular sheet
MS master substrate
K1 first combination of printing fluid and substrate
W change of the printing fluid and/or substrate
K2 second combination of printing fluid and substrate
ICC predetermined ICC profile
M0 machine default setting/previous machine setting
M1 first machine setting
M2 second machine setting
ME master machine setting
R relative value
EW1 first setting value
A determining a master setting
a1 provision
a2 printing a test print
a3 recording all or at least a selection of the test fields
a4 computational determination and storage of at least one first setting value
a4' computational determination and storage of at least one first setting value
b preparing the printing of a print job
b2 printing the test print
b3 recording all or at least a selection of the test fields
b4 computational determination and storage of at least one second setting value
b5*a* producing a second printing forme or a set of second printing formes
b5*b* varying the calibration of the printing heads
c printing the print job

The invention claimed is:

1. A method for printing a print job with a printing machine, the method comprising:

a) determining a master setting for the printing machine by:

a1) providing a substrate as a master substrate;

a2) printing a first test print including a multiplicity of test fields, with the printing machine, and using a first combination of a printing fluid and the master substrate;

a3) recording all or at least a selection of the test fields of the first test print by using a recording device; and a4) computationally determining and storing at least one first setting value for a first machine setting of the printing machine as the master setting;

or a1) providing a substrate as a master substrate; and a4') computationally determining and storing at least one first setting value for a first machine setting of the printing machine as a master setting and for a first combination of a printing fluid and the master substrate, and carrying out the computational determination based on a computer-implemented mathematical model including a mathematical representation of the printing machine, of the printing fluid and of the substrate, or based on an artificial intelligence trained with stored data relating to at least one of printing machines or substrates;

b) preparing printing of a print job with the printing machine by:

b1) changing the substrate to a second combination of printing fluid and substrate;

b2) printing a second test print including a multiplicity of test fields, with the printing machine, and using the second combination of printing fluid and substrate and the master setting;

b3) recording all or at least a selection of the test fields of the second test print by using a recording device; and b4) computationally determining and storing at least one second setting value for a second machine setting, and defining the second setting value as a value relative to the master setting; and c) printing the print job with the printing machine, and using the second combination of printing fluid and substrate and the second machine setting.

2. The method according to claim 1, which further comprises providing the second machine setting with a variation of an amount of printing ink or an amount of at least one printing ink of a set of printing inks in relation to the first machine setting, and using the second setting value during the variation.

3. The method according to claim 1, which further comprises carrying out step b) by additionally b5*a*) producing a second printing forme or a set of second printing formes in step b).

4. The method according to claim 3, which further comprises producing the second printing forme or the set of second printing formes for transferring a modified amount of the printing ink onto the substrate.

5. The method according to claim 4, which further comprises carrying out an exposure in the production, and using the second setting value or a value corresponding to the second setting value or a value calculated from the second setting value.

6. The method according to claim 3, which further comprises carrying out step c) by using the second printing forme or the set of second printing formes.

7. The method according to claim 1, which further comprises providing the second machine setting with a variation of an amount of inkjet ink or an amount of at least one inkjet ink of a set of inkjet inks in relation to the first machine setting, and using the second setting value during the variation.

8. The method according to claim 1, which further comprises carrying out step b) by additionally b5*b*) varying a calibration of printing heads of the printing machine.

* * * * *